US012539315B2

(12) United States Patent
Shu et al.

(10) Patent No.: US 12,539,315 B2
(45) Date of Patent: Feb. 3, 2026

(54) SLEEP-AIDING PROBIOTIC GOAT MILK POWDER AND PREPARATION METHOD THEREOF

(71) Applicant: SHAANXI UNIVERSITY OF SCIENCE AND TECHNOLOGY, Xi'an (CN)

(72) Inventors: Guowei Shu, Xi'an (CN); Anxin Mao, Xi'an (CN); Guoliang Li, Xi'an (CN); Qiqi Zheng, Xi'an (CN); Qisheng Hu, Xi'an (CN); Xinru Yu, Xi'an (CN); Xu Zhang, Xi'an (CN); Shiru Deng, Xi'an (CN); Qian Wang, Xi'an (CN); Qinfeng Xu, Xi'an (CN)

(73) Assignee: SHAANXI UNIVERSITY OF SCIENCE AND TECHNOLOGY, Xi'an (CN)

( * ) Notice: Subject to any disclaimer, the term of this patent is extended or adjusted under 35 U.S.C. 154(b) by 0 days.

(21) Appl. No.: 19/223,700

(22) Filed: May 30, 2025

(65) Prior Publication Data

US 2025/0375482 A1    Dec. 11, 2025

(30) Foreign Application Priority Data

Jun. 7, 2024   (CN) .......................... 202410739020.4

(51) Int. Cl.
| | | |
|---|---|---|
| A61K 35/744 | (2015.01) | |
| A61K 9/19 | (2006.01) | |
| A61K 31/197 | (2006.01) | |
| A61K 35/20 | (2006.01) | |
| A61K 35/747 | (2015.01) | |

(52) U.S. Cl.
CPC ............... *A61K 35/20* (2013.01); *A61K 9/19* (2013.01); *A61K 31/197* (2013.01); *A61K 35/747* (2013.01)

(58) Field of Classification Search
CPC .................................................. A61K 35/744
See application file for complete search history.

(56) References Cited

U.S. PATENT DOCUMENTS

2020/0155623 A1    5/2020   Chen et al.

FOREIGN PATENT DOCUMENTS

| | | |
|---|---|---|
| CN | 114480213 A | 5/2022 |
| CN | 102839135 A | 3/2023 |

(Continued)

OTHER PUBLICATIONS

English machine translation of Guangdong Yuechuang Biotechnology Company Ltd., CN 117721033 A, Mar. 2024.*

(Continued)

*Primary Examiner* — Rosanne Kosson
(74) *Attorney, Agent, or Firm* — Cooper Legal Group, LLC (57) ABSTRACT

A sleep-aiding probiotic goat milk powder and a preparation method thereof are provided. Goat milk is used as the raw material, and the goat milk is sterilized and cooled, then inoculated with *Limosilactobacillus fermentum* KD6, which produces the sleep-aiding functional factor γ-aminobutyric acid. The strain was deposited in the China Center for Type Culture Collection (CCTCC) on Sep. 7, 2023, with the deposit number CCTCC NO: M20231642. After being stirred evenly, the mixture is fermented at a constant temperature without the need to add precursors of γ-aminobutyric acid such as glutamic acid or sodium glutamate. Upon completion of fermentation, probiotic fermented goat milk containing γ-aminobutyric acid is obtained, and is then subjected to vacuum low-temperature spray drying to obtain the functional sleep-aiding probiotic goat milk powder.

2 Claims, 8 Drawing Sheets
Specification includes a Sequence Listing.

(56) References Cited

FOREIGN PATENT DOCUMENTS

| | | |
|---|---|---|
| CN | 116656562 A | 8/2023 |
| CN | 116814464 A | 9/2023 |
| CN | 117721033 A | 3/2024 |
| KR | 20230050119 A | 4/2023 |

OTHER PUBLICATIONS

Alignment of instant SEQ ID No. 1 with SEQ ID No. 1 of Guangdong Yuechuang Biotech Co. Ltd., CN 117721033 A, NCBI nucleotide Blast, Blast 2 web site, https://blast.ncbi.nlm.nih.gov/Blast.cgi?BLAST_SPEC=blast2seq&LINK_LOC=align2seq&PAGE_TYPE=BlastSearch, Jul. 28, 2025.*
Notice of first Office action dated Dec. 12, 2024 in SIPO application No. 202410739020.4, 16 pages.
Retrieval report—First search dated Dec. 9, 2024 in SIPO application No. 202410739020.4, 7 pages.
Notification to Grant Patent Right for Invention dated Feb. 24, 2025 in SIPO application No. 202410739020.4, 3 pages.
Retrieval report—Supplementary search dated Feb. 8, 2025 in SIPO application No. 202410739020.4, 4 pages.
Shangguan Wenfei et al., "Optimization of fermentation conditions of γ-aminobutyric acid-producing Lactobacillus fermentum by response surface methodology", China Brewing, Dec. 25, 2019, pp. 87-91, vol. 38, Issue 12, 5 pages, with English abstract.

* cited by examiner

SLEEP-AIDING PROBIOTIC GOAT MILK POWDER AND PREPARATION METHOD THEREOF

CROSS-REFERENCE TO RELATED APPLICATIONS

This application claims priority to Chinese Patent Application No. 202410739020.4, filed on Jun. 7, 2024, the contents of which are hereby incorporated by reference.

INCORPORATION BY REFERENCE STATEMENT

This statement, made under Rules 77 (b) (5) (ii) and any other applicable rule incorporates into the present specification of an XML file for a "Sequence Listing XML" (see Rule 831 (a)), submitted via the USPTO patent electronic filing system or on one or more read-only optical discs (see Rule 1.52 (e) (8)), identifying the names of each file, the date of creation of each file, and the size of each file in bytes as follows:
File name: SequenceListing.xml
Creation date: May 28, 2025
Byte size: 3,200

TECHNICAL FIELD

The present disclosure belongs to the technical field of fermentation engineering, and in particular to a sleep-aiding probiotic goat milk powder obtained by fermentation of goat milk with *Limosilactobacillus fermentum* KD6 and spray drying, and a preparation method thereof.

BACKGROUND

Sleep, as a physiological activity crucial to human health, occupies approximately one-third of lifetime of a person. Sleep plays a key role in assisting the brain nervous system to store and restore energy, strengthening neuronal connections, and enhancing learning and memory. With the increasing number of insomnia patients and a trend toward younger demographics, consumer demand for sleep-aiding products has risen sharply. Currently, commercially available medicines are primarily represented by sedative-hypnotic medications such as benzodiazepines, which, while effective, may lead to side effects like medicine resistance and addiction with long-term use. Therefore, the search for and development of sleep-aiding foods to address insomnia through dietary therapy has become particularly urgent and necessary.

Melatonin is a commonly used sleep-aiding ingredient in health foods. It is an amine hormone produced by the pineal gland of mammals and humans, capable of illuminating melanin-producing cells, hence the name melatonin. Melatonin is a cosmetic hormone medicine that whitens the skin and delays aging. It may improve sleep, but there are issues such as low body temperature, excessive release of prolactin leading to infertility, and reduced male physiological desire.

γ-aminobutyric acid (GABA) is a natural active component and a non-protein functional amino acid. It is an important inhibitory neurotransmitter in the central nervous system of mammals, with biological functions such as calming nerves, regulating hormone secretion, improving lipid metabolism, and lowering blood pressure. Therefore, researching and developing foods rich in γ-aminobutyric acid is a necessary approach to addressing insomnia through dietary therapy

SUMMARY

To address the problems in the prior art, the present disclosure provides a sleep-aiding probiotic goat milk powder and a preparation method thereof. The method uses goat milk as the raw material, employs a food-grade strain/a strain that may be used for food—*Limosilactobacillus fermentum* KD6—for fermentation. This strain converts the glutamic acid naturally present in goat milk and the glutamic acid produced from protein decomposition into γ-aminobutyric acid. The fermented goat milk is then processed via low-temperature spray drying to obtain the sleep-aiding probiotic goat milk powder.

To achieve the above objective, the present disclosure provides the following solution: a *Limosilactobacillus fermentum* KD6, deposited at the China Center for Type Culture Collection (CCTCC), with the deposit number CCTCC NO: M20231642.

The disclosure further provides an application of *Limosilactobacillus fermentum* KD6 in treatment of insomnia, where *Limosilactobacillus fermentum* KD6 converts glutamic acid or sodium glutamate in a substrate containing glutamic acid or sodium glutamate into γ-aminobutyric acid.

In an embodiment, *Limosilactobacillus fermentum* KD6 converts glutamic acid or sodium glutamate in food containing glutamic acid or sodium glutamate into γ-aminobutyric acid.

In an embodiment, the food is goat milk.

The disclosure further provides a sleep-aiding probiotic fermented goat milk, where the freeze-dried bacterial powder of the *Limosilactobacillus fermentum* KD6 is added to the pre-treated goat milk, followed by constant-temperature fermentation at 34 degrees Celsius (° C.)-43° ° C. for 20 hours (h)-28 h to obtain the sleep-aiding probiotic fermented goat milk.

In an embodiment, the addition amount of the freeze-dried bacterial powder of *Limosilactobacillus fermentum* KD6 is 0.01%-0.05%, resulting in a γ-aminobutyric acid content of 0.488 grams per liter (g/L) to 0.633 g/L in the sleep-aiding probiotic fermented goat milk, a probiotic viable count of $2.32 \times 10^8$ colony-forming units per milliliter (CFU/mL)-$4.12 \times 10^8$ CFU/mL, and a pH of 3.56-4.59.

The disclosure further provides a preparation method for the sleep-aiding probiotic fermented goat milk, including sterilizing goat milk at 90° C.-95° C. for 5-10 minutes (min), cooling to 36° C.-40° C., adding 0.01%-0.05% of the freeze-dried bacterial powder of *Limosilactobacillus fermentum* KD6, and fermenting at a constant temperature of 34° C.-43° C. for 20-28 h, and obtaining the sleep-aiding probiotic fermented goat milk.

The disclosure further provides a sleep-aiding probiotic fermented goat milk powder, where the sleep-aiding probiotic fermented goat milk or the sleep-aiding probiotic fermented goat milk prepared by the above method is subjected to vacuum low-temperature spray drying to obtain the sleep-aiding probiotic fermented goat milk powder.

In an embodiment, the sleep-aiding probiotic fermented goat milk powder has a γ-aminobutyric acid content of 3.561 grams per kilogram (g/kg)-4.648 g/kg and a probiotic viable count of $1.15 \times 10^8$ colony-forming units per gram (CFU/g)-$2.50 \times 10^8$ CFU/g.

In an embodiment, the conditions of the vacuum low-temperature spray drying include an inlet air temperature of 65° C.-75° C., a feed peristaltic pump opening of 30%-50%, and a vacuum pressure of 0.03 megapascal (MPa)-0.04 MPa.

The disclosure discloses the following technical effects.

The disclosure provides a *Limosilactobacillus fermentum* KD6, deposited at the China Center for Type Culture Collection with the deposit number CCTCC NO: M20231642. The *Limosilactobacillus fermentum* KD6 may convert glutamic acid or sodium glutamate in substrates containing glutamic acid or sodium glutamate into γ-aminobutyric acid, thereby preparing sleep-aiding foods containing γ-aminobutyric acid.

The disclosure provides a sleep-aiding probiotic fermented goat milk. Unlike the method of directly adding γ-aminobutyric acid to conventional sleep-aiding foods, the disclosure introduces γ-aminobutyric acid into goat milk by fermenting goat milk with *Limosilactobacillus fermentum* KD6. The *Limosilactobacillus fermentum* KD6 converts free glutamic acid in goat milk and glutamic acid generated from protein hydrolysis into γ-aminobutyric acid, thereby enhancing the sleep-aiding functionality of the goat milk. Additionally, the fermentation by *Limosilactobacillus fermentum* KD6 produces metabolites such as lactic acid, which helps to reduce the gamy odor of the milk, improving its sensory evaluation.

In addition, the disclosure employs low-temperature spray drying technology to prepare the sleep-aiding probiotic fermented goat milk into the sleep-aiding probiotic fermented goat milk powder, and the low-temperature spray drying may maintain a high viable count in the goat milk powder. The goat milk powder produced contains up to $1.0 \times 10^8$ CFU/g. Notably, no heat-resistant probiotic protectants or other additives are added during preparation, making the ingredient list simpler and more easily accepted by consumers. Overall, the sleep-aiding probiotic goat milk powder prepared by the disclosure is rich in γ-aminobutyric acid and probiotics, offering dual functions of aiding sleep and regulating intestinal flora balance.

DETAILED DESCRIPTION OF THE EMBODIMENTS

To further explain the disclosure, the following describes the embodiments in conjunction with the drawings. These descriptions are intended to illustrate the features and advantages of the disclosure and are not intended to limit the scope of the claims.

Embodiment 1: Isolation, Identification, and Probiotic Properties of *Limosilactobacillus fermentum* KD6

1. Isolation of *Limosilactobacillus fermentum* KD6

Milk kefir grains are inoculated at 3% into sterilized and cooled goat milk and fermented at room temperature for 24 hours (h), and then are used as samples. After a series of dilutions, and 30 strains of lactic acid bacteria are isolated using the plate spread method. Through repeated primary and secondary screening, a strain of *lactobacillus* with strong γ-aminobutyric acid production capacity is obtained.

2. Identification of *Limosilactobacillus fermentum* KD6

16S ribosomal deoxyribonucleic acid (16S rDNA) is used for strain identification. After amplifying and purifying the target fragment, the strain is characterized based on the homology analysis of the partial 16S rDNA gene fragments. The measured sequence is compared and analyzed with the base sequence in the National Center for Biotechnology Information (NCBI) database, confirming that the strain is *Limosilactobacillus fermentum*. The base pair sequence is as follows:

CCGAGGAAGGGCGGACGGGTGAATTACCAGTAGGTAACCTGGCCCGAAG

CGGGGGGCTACCACCGGAAACCAATTGTAATTCCGCATAACAACGTTGT

TCCCCAGAGTCCGAGTTAAAAAATGGGTTTTGGCTATCACTTTTGGATG

GTCCCGCGGTGCATTAGCTAGTTGGTGGGGTAACGGCTCACCAAGGCGA

TGATGCATAGCCGACTTGAGAGGGTAATCGGCCACAATGGGACTGAGAC

ACGGCCCATACTCCTACGGGAGGCAGCAGTAGGGAATCTTCCACAATGG

GCGCAAGTCTGATGGAGCAACGCCGCGTGAGTGAAGAAGGGTTTCGGCT

CGTAAAACTCTGTTGTTAAAGAAGAACATATATGAGAGTAACTGTTCAT

ACATTGACGGTATTTAACCAGAAAGCCACGGCTAACTACGTGCCAGCAG

CCGCGGTAATACGTAGGTGGCAAGCGTTGTCCGGATTTATTGGGCGTAA

AGCGAGTGCAGGCGGTTTTTTAAGTCTGATGTGAAAGCCTTCGGCTCAA

CCGAAGAAGTGCATCGGAAACTGGAAAACTTGAGTGCAGAAGAGGGTAG

TGGAACTCCATGTGTAGCGGTGGAAATGCGTAGATATATGGAAGAACAC

CAGTGGCGAAGGCGGCTGTCTGGTCTGCAACTGACGCTGAGACTCGAAA

GCATGGGTAGCGAACAGGATTAGATACCCTGGTAGTCCATGCCGTAAAC

GATGAATGCTAAGTGTTGGAGGGTTTCCGCCCTTCAGTGCTGCAGCTAA

CGCATTAAGCATTCCGCCTGGGGAGTACGGCCGCAAGGTTGAAACTCAA

AGGAATTGACGGGGCCCGCACAAGCGGTGGAGCATGTGGTTTAATTCG

AAGCTACGCGAAGAACCTTACCAGGTCTTGACATCTTGCGCCAATCTTA

GAGATAGGGCGTTTCCTTCGGGAACGCAATGACAGGTGGTGCATGGTTG

TCGTCAGCTCGTGTCGTGAGATGTTGGGTTAAGTCCCGCAACGAGCGCA

ACCCTTGTTATTAGTTGCCAGCATTAAGTTGGGCACTCTGGTGAGACTG

CCGGTGACAAACCGGAGGAAGGTGGGGACGACGTCAGATCATCATGCCC

CTTATGACCTGGGCTACACACGTGCTACAATGGATGGTACAACGAGTTG

CGAACTCGCGAGGGCAAGCAAATCTCTTAAAACCGTTCTCAGTTCGGAC

TGCAGGCTGCAACTCGCCTGCATGAAGTCGGAATCGCTAGTAATCGCGG

ATCAGCATGCCGCGGTGAATACGTTCCCGGGCCTTGTACACACCGCCCA

GTCACACCATGAGAGTTTGTAACACCCAAAGTCGG

The strain is named *Limosilactobacillus fermentum* KD6 and deposited on Sep. 7, 2023 at the China Center for Type Culture Collection (CCTCC), Wuhan University, 299 Bayi Road, Wuchang District, Wuhan, Hubei Province. The deposit number is CCTCC NO: M20231642.

Embodiment 2: Study on the Characteristics of *Limosilactobacillus fermentum* KD6

1. Observation of Bacterial and Colony Morphology

*Limosilactobacillus fermentum* KD6 is inoculated into de Man, Rogosa and Sharpe (MRS) broth at 1% inoculation amount and cultured at 37° C. for 24 h. Samples are taken for observation of bacterial and colony morphology. The bacterial cells are stained with toluidine blue for microscopic observation, and the colony morphology is observed using the dilution plate spread method. The bacterial and colony morphology are shown in FIG. 1.

Figure 1:
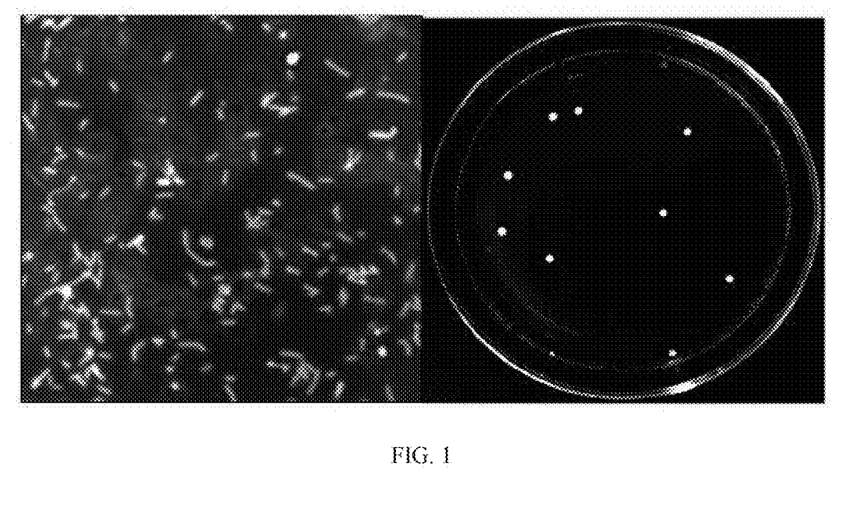
FIG. 1 shows bacterial and colony morphology of *Limosilactobacillus fermentum* KD6.

As shown in FIG. 1, *Limosilactobacillus fermentum* KD6 is short rod-shaped, with some bacterial cells curved, no branches or spores, and the ends of the bacterial cells are mostly blunt circular. The colonies on MRS agar are convex, circular, with a milky white color, smooth and moist appearance, neat edges, and easily picked, all of which conform to the morphological characteristics of lactic acid bacteria colonies.

2. Comparison of Probiotic Properties

The hemolysis, antibiotic sensitivity, and tolerance to acid, bile salts, and sodium chloride of three probiotic strains, namely *Limosilactobacillus fermentum* KD6, the publicly known *Lactiplantibacillus plantarum* 7830 and *Lacticaseibacillus rhamnosus* L20 are compared. The results are shown in FIG. 2-FIG. 6.

Figure 2:
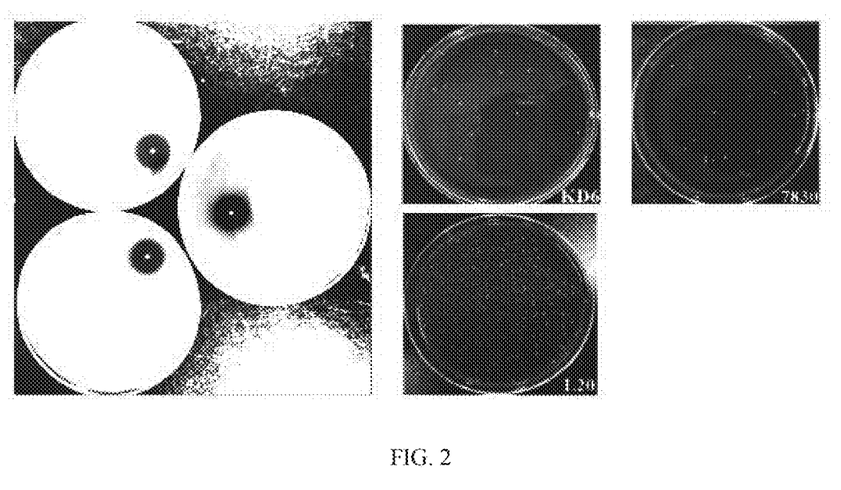
FIG. 2 shows hemolysis of *Limosilactobacillus fermentum* KD6 and *Escherichia coli*.

As shown in FIG. 2, clear transparent halos, namely β-hemolysis are observed on Columbia blood agar plates inoculated with hemolytic *Escherichia coli*, while no hemolysis is observed on Columbia blood agar plates inoculated with the three probiotic strains, indicating that all three strains are non-hemolytic and are safe strains. The lack of hemolysis ensures the safety of the strains and is used as one of the screening criteria for probiotic strains.

Figure 3:
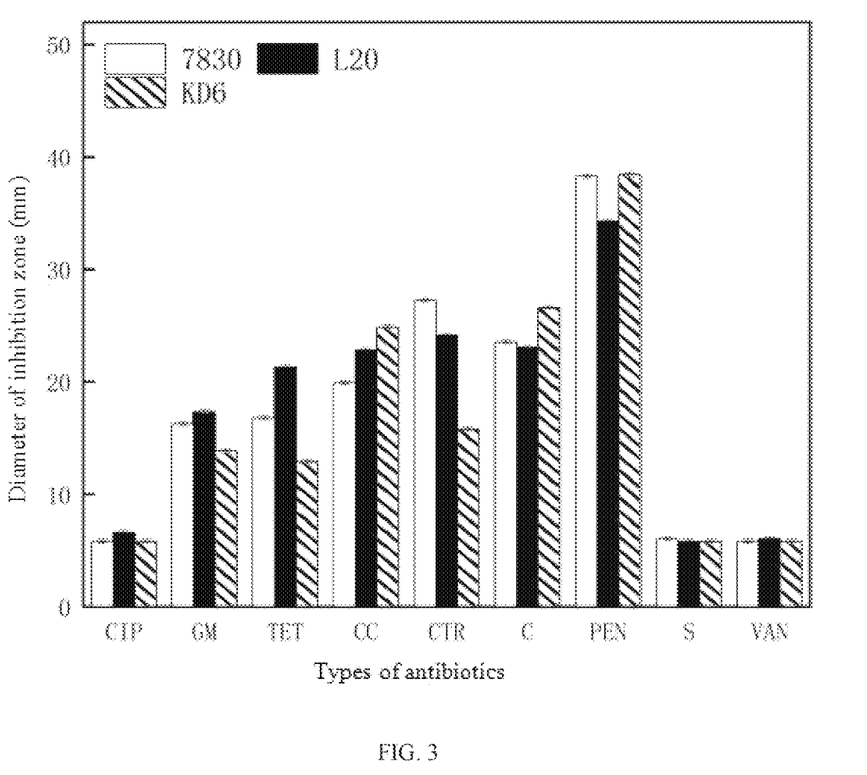
FIG. 3 shows antibiotic sensitivity of *Limosilactobacillus fermentum* KD6.

As shown in FIG. 3, the three probiotic strains are generally sensitive to penicillin, with inhibition zones ranging from 31.26 millimeters (mm) to 44.38 mm, and resistant to ciprofloxacin, streptomycin, and vancomycin. However, significant differences in resistance are observed among different strains. For ciprofloxacin (CIP), KD5 shows significantly higher sensitivity than the other strains (p<0.05), with an inhibition zone of 10.71 mm, while other strains are generally resistant. For gentamicin (GM), KD11 is sensitive (p<0.05), with an inhibition zone of 24.72 mm. For tetracycline (TET), KD5 is sensitive (p<0.05), with an inhibition zone of 28.71 mm. For clindamycin (CC), KD5 is sensitive (p<0.05), with an inhibition zone of 27.31 mm. For ceftriaxone (CTR), KD11 is sensitive (p<0.05) and significantly higher than the other strains, with an inhibition zone of 44.38 mm. For chloramphenicol (C), KD11 is sensitive (p<0.05), with an inhibition zone of 36.38 mm.

Zhang Zhuoyang et al. studied the antibiotic sensitivity of multiple lactic acid bacteria strains and found that most tested lactic acid bacteria have inherent resistance to streptomycin and vancomycin, and this resistance is generally non-transferable to pathogenic bacteria. Guo et al. studied the resistance of *Lactobacillus delbrueckii* subsp. *Bulgaricus* isolated from traditional dairy products, and the results showed that all *Lactobacillus delbrueckii* subsp. *Bulgaricus* were sensitive to gentamicin, clindamycin, tetracycline, and chloramphenicol, but exhibited different resistance to ciprofloxacin, streptomycin, and vancomycin, which is consistent with the conclusion of the disclosure.

Acid tolerance is an important criterion for selecting probiotic strains. The pH value of human gastric juice is constantly changing, typically around 3.0, and may reach 1.8 under fasting conditions. Probiotics must survive the extremely acidic environment of gastric juice to exert the positive probiotic effects in the human body. The acid tolerance results of the three strains are shown in FIG. 4.

Figure 4:
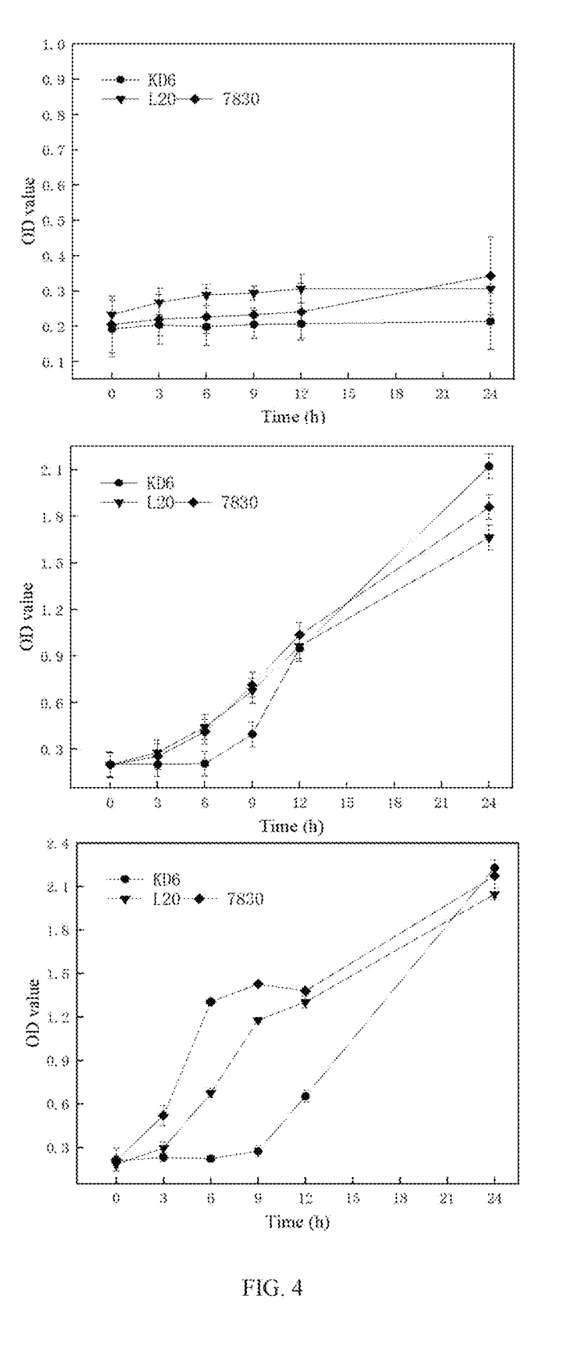
FIG. 4 shows acid tolerance of *Limosilactobacillus fermentum* KD6.

In FIG. 4, the growth of probiotics is inhibited in acidic environments, with the inhibition becoming more pronounced as the pH decreased. When the pH drops to 5, all three strains of probiotics show strong tolerance, generally following the "S"-shaped microbial growth pattern. After 24 h of fermentation, the final $OD_{600\ nm}$ values exceed 2.0. When the pH drops to 4, there is little difference in the tolerance of the three probiotics, with $OD_{600\ nm}$ values ranging from 1.663 to 2.122. The acid resistance ranking is: KD6>7830>L20, where the growth curve of KD6 has a relatively small impact and exhibits strong acid resistance. When the pH drops to 3, all three strains grow slowly. Chen Junfei et al. isolated 6 strains of lactic acid bacteria from pickles for acid resistance testing. The results showed that all strains had the highest $OD_{600\ nm}$ value at pH 5.5, and almost no strain growth at pH≤4. In comparison, the three strains in the present disclosure have overall stronger acid resistance, which may be due to the poorer acid resistance of the heterologous fermentation lactic acid bacteria isolated from pickles compared to the homologous fermentation lactic acid bacteria. Studies indicate that strains from different sources have varying degrees of tolerance to the human digestive tract, and the effects of probiotics are strain specific. Aiba et al. reported a strain of *Lactobacillus johnsonii* No. 1088 isolated from human gastric juice, which may maintain a 10% survival rate even after being treated for 2 hours in a pH 1.0 environment.

After being processed by gastric juice, food enters the duodenum and comes into full contact with bile salts that have antibacterial properties. Bile salts may cause strain death by disrupting the integrity of cell membranes. Therefore, the tolerance of probiotics to high concentrations of bile salts in the human gut is an important indicator for screening probiotics. The tolerance results of all three strains to bile salts are shown in FIG. 5.

Figure 5:
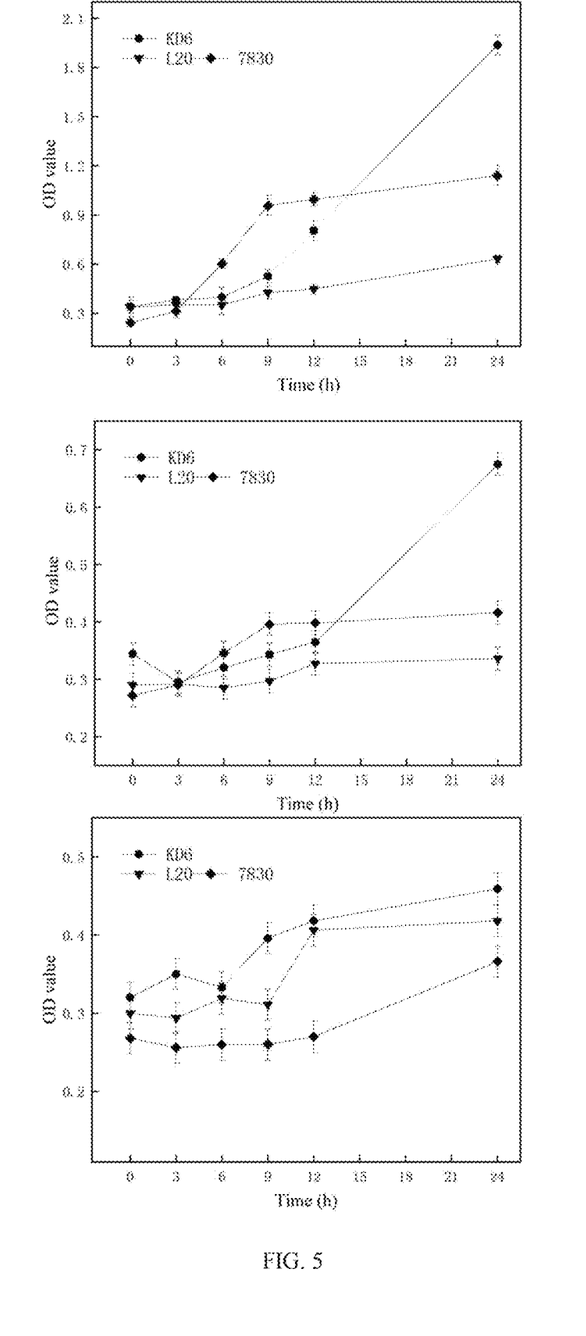
FIG. 5 shows bile salt tolerance of *Limosilactobacillus fermentum* KD6.

As shown in FIG. 5, with the increase of bile salt concentration, the growth of bacterial cells is more affected. At a bile salt concentration of 0.1%, the OD 600 nm values range from 0.271 to 1.936, with KD6 exhibiting strong bile salt tolerance and a final $OD_{600\ nm}$ value of 1.936 after 24 h of culture. Strain 7830 shows some tolerance in the early stage (before 12 h), but its growth trend gradually slows down with prolonged treatment duration. At a bile salt concentration of 0.2%, the $OD_{600\ nm}$ values range from 0.221 to 0.661, with the tolerance ranking being KD6>7830>L20, indicating that KD6 maintains good tolerance even at higher bile salt concentrations. Studies show that 0.3% bile salt is the maximum concentration in the intestines of healthy adult males, and food typically takes 1-4 h to pass through. After 12 h of treatment at this concentration, all three strains of probiotics exhibit a certain tolerance, showing a slow overall growth trend, with KD6 achieving a final $OD_{600\ nm}$ value of 0.459 after 24 h of culture. Reuben et al. point out that the bile salt tolerance concentration of lactic acid bacteria with probiotic potential needs to reach 0.3%. All three strains in the present disclosure meet the requirements.

Probiotics need to pass through the stomach and small intestine before finally colonizing in the large intestine in order to exert their probiotic effects. Various osmotic pressures are also key factors that bacteria need to tolerate. The effect of adding different concentrations of sodium chloride to MRS broth on the growth of three strains is shown in FIG. 6.

Wu Yating et al. screened three *Lactiplantibacillus plantarum* strains with strong osmotic pressure tolerance from naturally fermented chili paste, capable of tolerating up to 7% NaCl concentration. In comparison, strain 7830 in the present disclosure exhibits even stronger osmotic pressure tolerance. However, some studies suggest that the osmotic pressure tolerance of probiotics is influenced by their long-term environment, so probiotics may adapt to stable changes in osmotic pressure. However, sudden increases or decreases in osmotic pressure may greatly inhibit the growth of probiotics and even lead to death.

Figure 6:
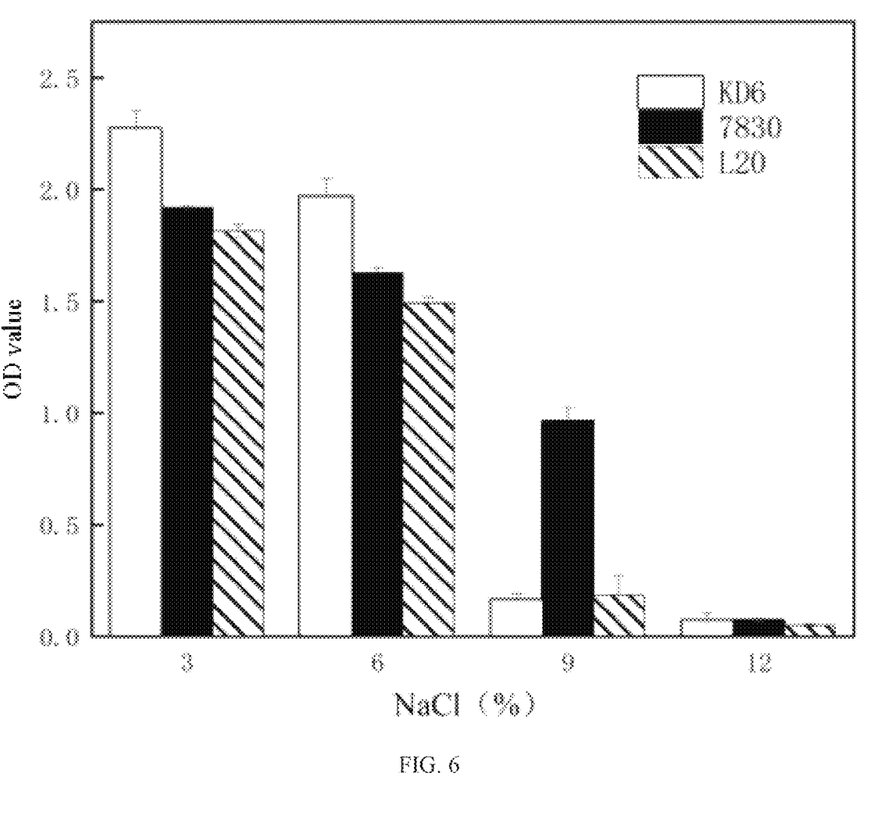
FIG. 6 shows sodium chloride tolerance of *Limosilactobacillus fermentum* KD6.

As shown in FIG. 6, the $OD_{600\ nm}$ values of the strains decrease with the increase of NaCl content. When the mass fraction of NaCl is 3%, the growth of lactic acid bacteria is basically not affected, with $OD_{600\ nm}$ values ranging from 1.727 to 2.272, and KD6 showing significantly higher acid tolerance than the other strains (p<0.05). When the mass fraction of NaCl is 6%, the growth of other strains is significantly inhibited, with $OD_{600\,nm}$ values ranging from 1.49 to 1.622, but KD6 has a higher $OD_{600\,nm}$ value of 1.968 (p<0.05). When the mass fraction of NaCl is greater than 6%, the growth of lactic acid bacteria is extremely slow, with only 7830 showing a certain growth trend (p<0.05), and the $OD_{600\,nm}$ values are 0.965. When the mass fraction of NaCl is 12%, the $OD_{600\,nm}$ values of the strains are all below 0.100.

Figure 7:
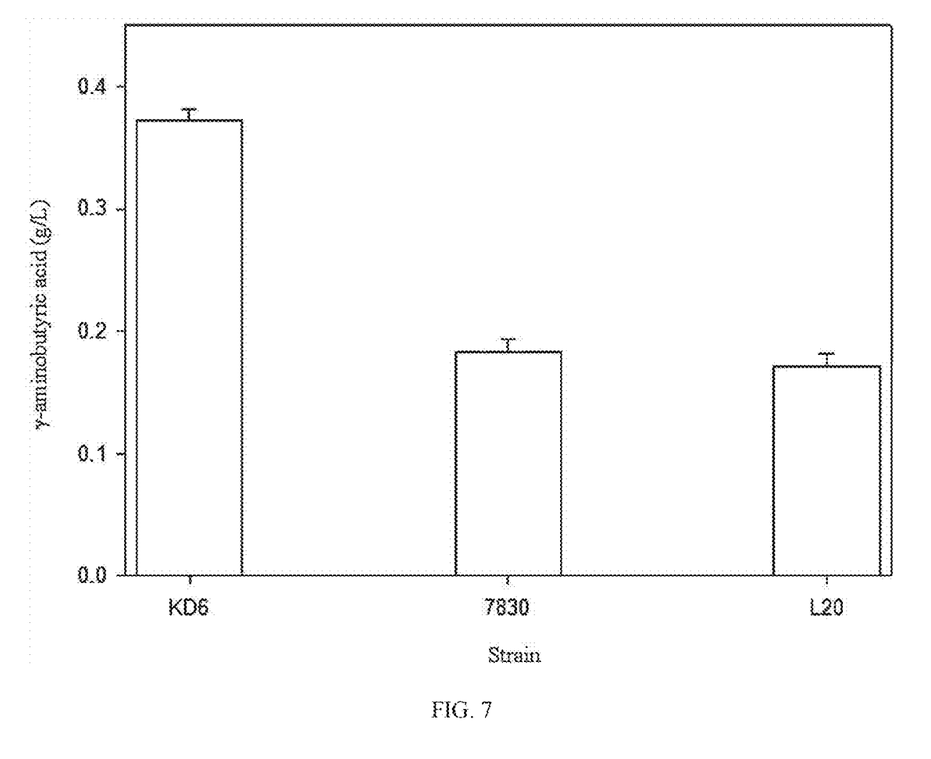
FIG. 7 shows effect of *Limosilactobacillus fermentum* KD6 on γ-aminobutyric acid production in fermented goat milk.

The third-generation activated strains are inoculated into goat milk at a 5% inoculation amount. After 24 h of constant temperature fermentation at 37° C., the whey is separated and the GABA content is determined using the Berthlot colorimetric method, and the γ-aminobutyric acid concentration is found to be in the range of 0-1.0 microgram per milliliter (μg/mL). The standard curve equation is y=2.0686x+0.0804, and the regression equation coefficient $R^2$ is 0.9968, indicating a strong linear relationship between absorbance and γ-aminobutyric acid concentration. This linear relationship range may be used to determine γ-aminobutyric acid concentration. The GABA production results for the three strains are shown in FIG. 7. It may be seen from FIG. 7 that without adding sodium glutamate to the goat milk, all three strains of probiotics convert high concentrations of GABA, attributed to the high activity of glutamic acid decarboxylase in probiotics, which converts free glutamic acid in goat milk or glutamic acid produced by protein hydrolysis into GABA. After 24 h of fermentation at 37° C., the range of GABA production in goat milk is 0.1709 to 0.3718 g/L, with KD6 producing significantly higher GABA than the other strains (p<0.05). Sun Shixin et al. reported *Lactococcus lactis* subsp. *lactis* 4043, which was inoculated at a 3% inoculation amount in a milk-based substrate medium containing 2 g/L sodium glutamate. After 48 h of fermentation at 30° C., the strain produced approximately 0.39 g/L of GABA. Nejati F. et al. cultured *Lactococcus lactis* DBCA and *Lactiplantibacillus plantarum* PU11 in sterilized condensed milk, achieving a GABA concentration of 0.14 g/L after 48 h of co-fermentation at 37° C. By comparison, it may be seen that the GABA ability prepared by KD6 transformation belongs to a relatively high level.

Embodiment 3: Preparation of Sleep-Aiding Probiotic Fermented Goat Milk and Goat Milk Powder 1. Effects of Fermentation Conditions on GABA Production in Goat Milk Fermented by *Limosilactobacillus fermentum* KD6

Figure 8:
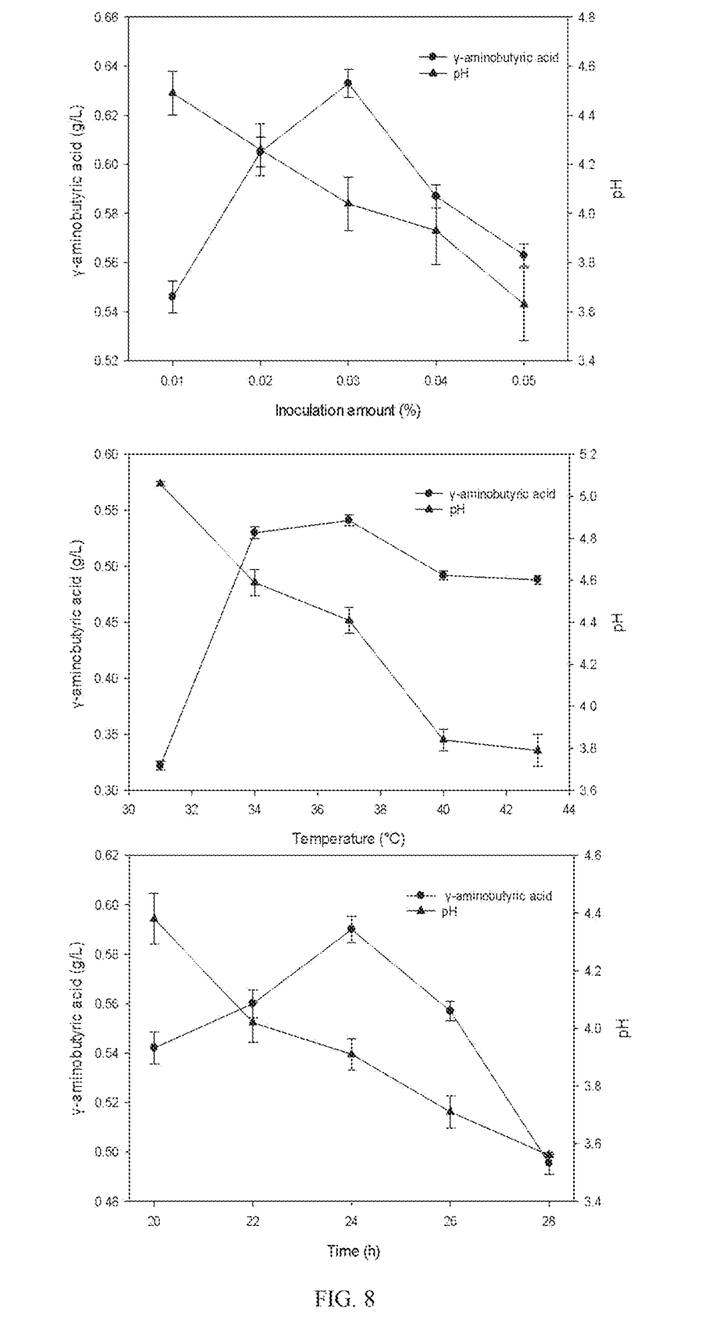
FIG. 8 shows effects of inoculation amount, temperature, and duration on γ-aminobutyric acid production in goat milk fermented by *Limosilactobacillus fermentum* KD6.

The freeze-dried bacterial powder of *Limosilactobacillus fermentum* KD6 is inoculated into goat milk as a starter to study the effects of inoculation amount (0.01%, 0.02%, 0.03%, 0.04%, 0.05%, weight per volume (w/v)), fermentation temperature (31° C., 34° C., 37° C., 40° C., 43° C.), and fermentation duration (20 h, 22 h, 24 h, 26 h, 28 h) on GABA production in goat milk fermented by *Limosilactobacillus fermentum* KD6. The pH and γ-aminobutyric acid content of the fermented goat milk are measured. The basic experimental conditions are fermentation duration of 20 h, temperature of 37° C., and inoculation amount of 0.01%. As shown in FIG. 8, with the increase of inoculation amount, the γ-aminobutyric acid content in goat milk fermented by *Limosilactobacillus fermentum* KD6 first increases and then decreases, and the pH gradually decreases, with γ-aminobutyric acid content ranging from 0.546 g/L to 0.633 g/L. As the fermentation temperature increases, the γ-aminobutyric acid content in goat milk fermented by *Limosilactobacillus fermentum* KD6 first increases and then decreases to tend to remain unchanged, and the pH rapidly decreases and then tends to remain unchanged, with γ-aminobutyric acid content ranging from 0.488 g/L to 0.541 g/L. As the fermentation duration prolongs, the γ-aminobutyric acid content in goat milk fermented by *Limosilactobacillus fermentum* KD6 first increases and then decreases to tend to remain unchanged, and the pH gradually decreases, with γ-aminobutyric acid content ranging from 0.494 g/L to 0.590 g/L. Targeting a γ-aminobutyric acid content of not less than 0.45 g/L, the suitable conditions for fermenting goat milk with *Limosilactobacillus fermentum* to produce γ-aminobutyric acid are: inoculation amount of 0.01% to 0.05%, temperature of 34° C.-43° C., and fermentation duration of 20 to 28 h.

According to the results of fermentation conditions, two batches of samples of sleep-aiding probiotic fermented goat milk, A and B, are obtained under fermentation condition A with an inoculation amount of 0.03% and culture at 37° C. for 24 h, and fermentation condition B with an inoculation amount of 0.01% and culture at 43° C. for 20 h. After sampling and determination, the viable counts are $4.12 \times 10^8$ CFU/mL and $2.32 \times 10^8$ CFU/mL respectively, and the GABA levels are 0.626 g/L and 0.504 g/L respectively. Then, the samples are dried by vacuum low-temperature spray (vacuum low-temperature spray dryer, BILON-VSD1500, Bilon Company) to prepare the sleep-aiding probiotic goat milk powder, with high-temperature spray drying (small spray dryer, YM-6000Y, Shanghai Yuming Instrument Co., Ltd.) as a control. The high-temperature spray drying conditions are an inlet air temperature of 170° C., outlet temperature of 85° C., while the vacuum low-temperature spray drying conditions are an inlet air temperature of 65° C. and an outlet temperature of 75° C., peristaltic pump openings of 30%-50%, and drying vacuum pressures of 0.03-0.04 MPa. The results are shown in Table 1:

TABLE 1

Effects of high-temperature and vacuum low-temperature spray drying on probiotic viable count and activity of antihypertensive peptide

| | Indicator | High-temperature spray drying | Vacuum low-temperature spray drying 65° C. (Pump 30%) | Vacuum low-temperature spray drying 65° C. (Pump 40%) | Vacuum low-temperature spray drying 75° C. (Pump 50%) |
|---|---|---|---|---|---|
| Sample A | Viable count/ $10^8$ CFU/g | 0.023 | 2.50 | 2.39 | 2.16 |
| | Survival rate/% | 0.56 | 61.09 | 58.23 | 52.72 |
| | GABA content/g/kg | 3.496 | 4.648 | 4.552 | 4.472 |
| Sample B | Viable count/ $10^8$ CFU/g | 0.011 | 1.39 | 1.23 | 1.15 |
| | Survival rate/% | 0.48 | 59.85 | 53.22 | 49.62 |
| | GABA content/g/kg | 2.873 | 3.758 | 3.634 | 3.561 |

As shown in Table 1, the sleep-aiding probiotic fermented goat milk samples A and B, after vacuum low-temperature spray drying, yield sleep-aiding probiotic goat milk powder with viable counts exceeding $1.0 \times 10^8$ CFU/g, ranging from $1.15 \times 10^8$ CFU/g to $2.50 \times 10^8$ CFU/g, survival rates of probiotics higher than 45%, ranging from 49.2% to 61.09%, and GABA contents higher than 3.5 g/kg, ranging from 3.561 g/kg to 4.648 g/kg. In contrast, the high-temperature spray drying group has viable counts ranging from $1.1 \times 10^6$ CFU/g to $2.3 \times 10^6$ CFU/g, survival rates below 1%, and reduced GABA content. Thus, vacuum low-temperature spray drying is suitable for preparing sleep-aiding probiotic goat milk powder.

What is claimed is:

1. A sleep-aiding probiotic fermented goat milk powder, comprising: goat milk powder and freeze-dried bacterial powder of *Limosilactobacillus fermentum* KD6 strain, wherein the *Limosilactobacillus fermentum* KD6 strain is deposited at the China Center for Type Culture Collection under deposit number CCTCC NO: M20231642.

2. The sleep-aiding probiotic fermented goat milk powder according to claim 1, wherein the sleep-aiding probiotic fermented goat milk powder has a γ-aminobutyric acid content of 3.561 g/kg-4.648 g/kg and a probiotic viable count of $1.15 \times 10^8$ CFU/g-$2.50 \times 10^8$ CFU/g.

\* \* \* \* \*

SEQUENCE LISTING

```
Sequence total quantity: 1
SEQ ID NO: 1              moltype = DNA   length = 1358
FEATURE                   Location/Qualifiers
source                    1..1358
                          mol_type = other DNA
                          organism = synthetic construct
SEQUENCE: 1
ccgaggaagg gcggacgggt gaattaccag taggtaacct ggcccgaagc gggggggctac   60
caccggaaac caattgtaat tccgcataac aacgttgttc cccagagtcc gagttaaaaa  120
atgggttttg gctatcactt ttggatggtc ccgcggtgca ttagctagtt ggtggggtaa  180
cggctcacca aggcgatgat gcatagccga cttgagaggg taatcggcca caatgggact  240
gagacacggc ccatactcct acgggaggca gcagtaggga atcttccaca atggcgcaa   300
gtctgatgga gcaacgccgc gtgagtgaag aagggtttcg gctcgtaaaa ctctgttgtt  360
aaagaagaac atatatgaga gtaactgttc atacattgac ggtatttaac cagaaagcca  420
cggctaacta cgtgccagca gccgcggtaa tacgtaggtg gcaagcgttg tccggattta  480
ttgggcgtaa agcgagtgca ggcggttttt taagtctgat gtgaaagcct tcggctcaac  540
cgaagaagtg catcggaaac tggaaaactt gagtgcagaa gagggtagtg gaactccatg  600
tgtagcggtg gaaatgcgta gatatatgga agaacaccag tggcgaaggc ggctgtctgg  660
tctgcaactg acgctgagac tcgaaagcat gggtagcgaa caggattaga taccctggta  720
gtccatgccg taaacgatga atgctaagtg ttggagggtt tccgcccttc agtgctgcag  780
ctaacgcatt aagcattccg cctggggagt acggccgcaa ggttgaaact caaaggaatt  840
gacggggggcc cgcacaagcg gtggagcatg tggtttaatt cgaagctacg cgaagaacct  900
taccaggtct tgacatcttg cgccaatctt agagatatggg cgtttccttc gggaacgcaa  960
tgacaggtgg tgcatggttg tcgtcagctc gtgtcgtgag atgttgggtt aagtcccgca 1020
acgagcgcaa cccttgttat tagttgccag cattaagttg ggcactctgg tgagactgcc 1080
ggtgacaaac cggaggaagg tggggacgac gtcagatcat catgcccctt atgacctggg 1140
ctacacacgt gctacaatgg atggtacaac gagttgcgaa ctcgcgaggg caagcaaatc 1200
tcttaaaacc gttctcagtt cggactgcag gctgcaactc gcctgcatga agtcggaatc 1260
gctagtaatc gcggatcagc atgccgcggt gaatacgttc ccgggccttg tacacaccgc 1320
ccagtcacac catgagagtt tgtaacaccc aaagtcgg                          1358
```